Nov. 21, 1967   R. LEGOUX   3,353,890
METHODS OF MANUFACTURING ELECTRON TUBES HAVING A
PHOTO-SENSITIVE LAYER IN A VACUUM SPACE TUBES
MANUFACTURED BY SAID METHODS AND DEVICES
FOR CARRYING OUT SAID METHODS
Filed Feb. 14, 1966   3 Sheets-Sheet 2

INVENTOR.
RENÉ LEGOUX
BY
AGENT

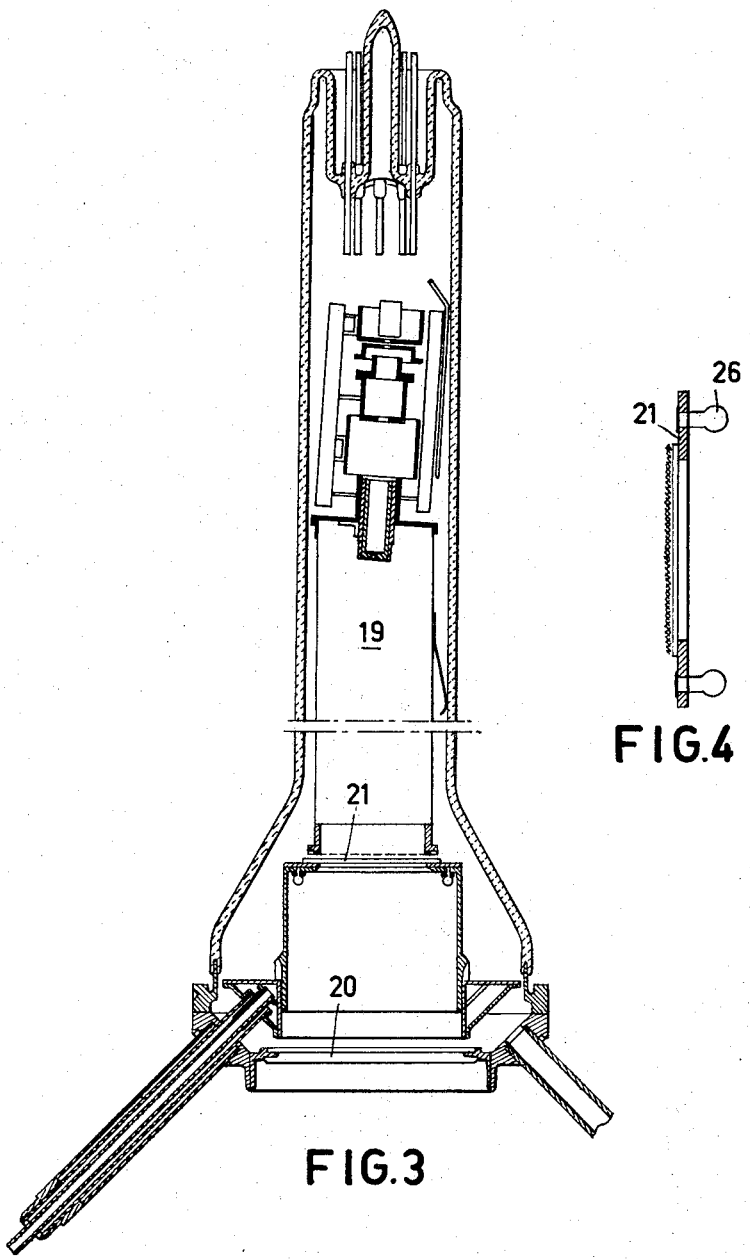

United States Patent Office 3,353,890
Patented Nov. 21, 1967

3,353,890
METHODS OF MANUFACTURING ELECTRON TUBES HAVING A PHOTO-SENSITIVE LAYER IN A VACUUM SPACE TUBES MANUFACTURED BY SAID METHODS AND DEVICES FOR CARRYING OUT SAID METHODS
René Legoux, Sceaux, France, assignor to North American Philips Company Inc., New York, N.Y., a corporation of Delaware
Filed Feb. 14, 1966, Ser. No. 527,199
Claims priority, application France, Feb. 23, 1965, 6,690
3 Claims. (Cl. 316—19)

ABSTRACT OF THE DISCLOSURE

A method and apparatus for assembling an electron discharge tube employing a heat-decomposable sensitive layer in which parts of the tube to be assembled are placed in a vacuum chamber and heated to degas the parts while the photo-sensitive layer mounted on a supporting body in an auxiliary vacuum chamber which communicates with the main vacuum chamber is degassed at a lower chamber before it is moved into the main chamber, after which the tube parts are pressed together and sealed.

The invention relates to a method of manufacturing an electron tube having a sensitive layer readily decomposing under the action of heat, for example a vidicon tube.

Such an electron tube comprises a photo-sensitive layer which may be a semiconductor.

For the manufacture of such tubes use might be made of a method known for the manufacture of cascade image intensifying tubes, in which case the tube is completely mounted in a vacuum space; this method has the advantage that the tube need not have an exhaust tube which must be sealed. This known method is carried out in a vacuum bell, which is heated at a fairly high temperature for effectively degassing the tube components.

In order to maintain the photo-electric properties of the photo-sensitive layer, which is readily decomposed, in a vidicon tube, it is desirable not to heat this layer in excess of about 100° C. However, this means that at lower temperatures the tubes are insufficiently degassed in the vacuum space. Therefore, the known method cannot be used as such for the manufacture of a vidicon tube in a vacuum space.

The invention has for its object to provide a similar method which is particularly suitable for the manufacture of vidicon tubes, in which on the one hand the tube components can be effectively degassed and on the other hand the photo-sensitive layer is not decomposed.

The method according to the invention is characterized in that in a vacuum space at two different places and at different temperatures a supporting body provided with a photo-sensitive layer and the essentially bipartite envelope with the further components of the electron tube are degassed by heat, after which at a lower temperature the supporting body with the photo-sensitive layer is fastened in one of the envelope portions and the two envelope portions are united by pressure and the finished tube removed from the vacuum space.

In this method it is thus possible to degas the tube components in one of the portions of the vacuum space at a high temperature, while during this process the photo-sensitive layer is held at a further place in the same vacuum space, where it is degassed at a considerably lower temperature. The temperature is chosen so that the photo-sensitive layer is not dissociated.

A suitable device for carrying out the method according to the invention is characterized in that it comprises a main vacuum space in which the tube is mounted to form a sealed unit and an auxiliary vacuum space communicating with the main vacuum space, the two spaces having their individual heating means and, if any, their individual cooling means, and means for displacing a supporting body with the photo-sensitive layer from the auxiliary space to the main space. The vacuum space is thus divided into a main space for uniting the two envelope portions and a side space in which the supporting body with the photo-sensitive layer can be temporarily arranged during the degassing process for the further tube components at a fairly high temperature.

The invention will be briefly explained with reference to the drawing, in which

FIG. 3 shows a vidicon tube manufactured by the method according to the invention and FIG. 4 shows the supporting body itself provided with a photo-sensitive layer and extensions for securing it in one of the part of the tube envelope.

Figure 1:
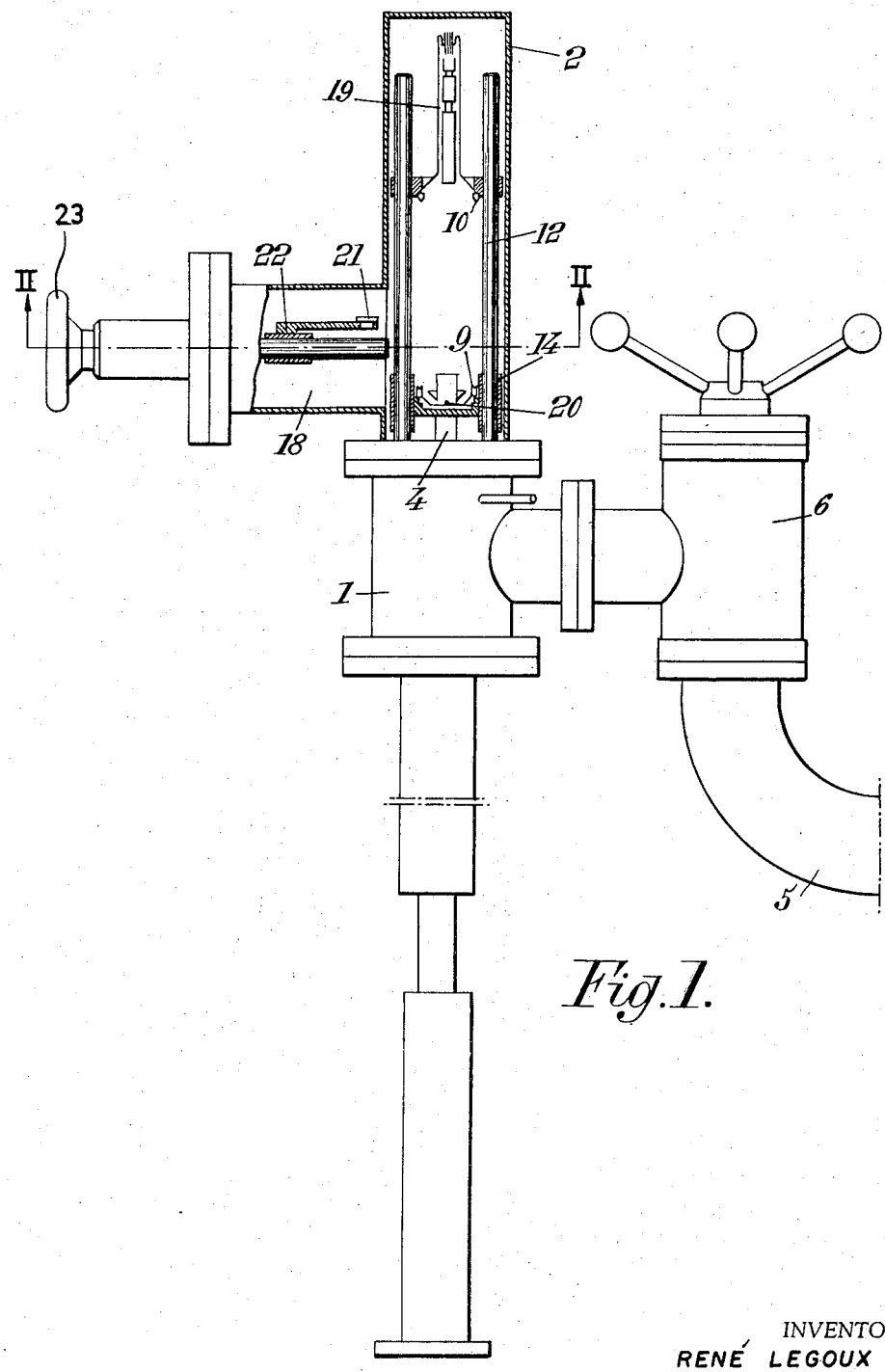
FIG. 1 shows partly in a side elevation and partly in a cross sectional view the device according to the invention.

The tubes to be assembled by the method according to the invention are manufactured in the interior of a cylindrical, vertical main vacuum space comprising a lower portion 1 of stainless steel on which a glass bell 2 is mounted. The main vacuum space communicates with a lateral auxiliary vacuum space 18.

The steel portion 1 support members for holding in place the tube components, for performing movements in the interior of the vacuum space and for sealing the tube. The vacuum in the bell communicates through a pump 5 with the body 1 with the interposition of a metal valve.

All parts forming together the vacuum bell and the pump are united by suitable metal connections so that the assembly is vacuum-tight up to pressures of $10^{-10}$ Torr.

The bulb of the tube is formed by two cylindrical portions, provided with metal annular parts 9 and 10, which can be interconnected by exerting a force pressing said parts towards each other; the connection is established by pressing together two metal parts of the same metal, the yield capacity of which is high. For this purpose a soft metal is used, preferably indium. This metal is provided in a V-shaped groove in the lowermost portion 9, forming one of the two parts of the seal.

The downwardly orientated rim of the upper portion 10 of said connection is coated with the soft metal by dipping said rim in the molten indium bath in the V-shaped groove of the portion 9.

The components of the vidicon tube are mounted in the interior of the vacuum space. One of the components of the tube, that is to say, the collar 19 comprising the electron gun and the portion 10 is fixed on two columns 12, extending parallel to the axis of the bell 2. The associated part of the tube forming the front window 20 with the portion 9 is secured to a block 14, which is adapted to move along the columns 12. This block is coupled with a rod 4 of a hydraulic press which can produce a force of a few tons. This mechanism must, of course, be coupled in known manner, for example through a vacuum bellows (not shown), so that during this process the vacuum is maintained in the bell.

Figure 2:
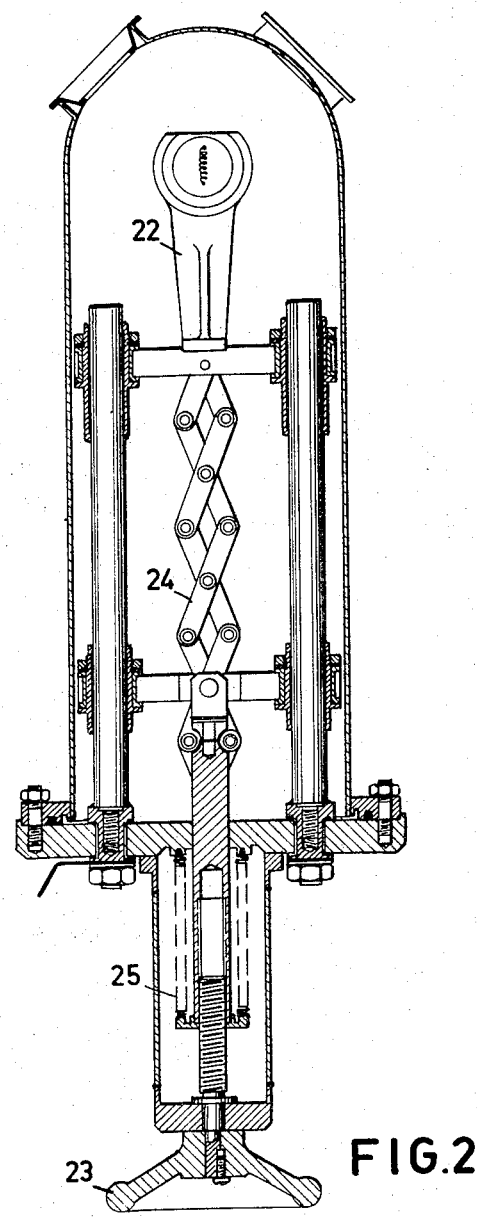
FIG. 2 is a sectional view taken on the line II—II in FIG. 1, of a mechanism for displacing a supporting body with a photo-sensitive layer.

At a given distance from the front window 20 of the vidicon tube a supporting body 21 having the photo-sensitive layer must be secured in place. This supporting body is first fastened inside the auxiliary vacuum space on a member 22 known per se. By means of a wheel 23 and a pantograph 24, operating via bellows 25 (see also FIG. 2), the body 21 can be moved by translating it in a horizontal direction and be brought just to its normal final position in the axis of the front window 20 of the tube.

After the termination of all operations the bell 2 is closed, exhausted and the tube portions are degassed.

For this purpose the window 20 is moved upwardly adjacent the collar 19 of the tube and is degassed at a temperature of 350° C. together with the further components.

However, during this period the body 21 is tilted away towards the center of the lateral auxiliary space 18, where it is degassed at a temperature of not more than 100 to 110° C.

At the termination of the degassing process the connection between the tube portions is prepared for the final seal.

For this purpose the block 14 is moved upwardly until the metal upper rim of the portion 10 is dipped in the bath of molten soft metal in the V-shaped groove of the portion 9. The soft metal covers within a few minutes the metal rim of the portion 10. Then the two portions are moved away from each other by lowering the block 14 to a sufficient height, so that the body 21 can be introduced between the portions 9 and 10.

After the termination of the thermal treatments at the high temperatures the temperature of the assembly is reduced to room temperature.

Subsequently the tube is sensitised by means of a known activating process. At the termination of this process the front window 20 is lowered so that the body 21, which is moved to its correct place by actuating the wheel 23, can be fastened to the front window 20.

When the body 21 is opposite the window 20, it is gripped, when the block 14 is moved upwardly, so that its spherical extensions 26 (FIG. 4) penetrate into corresponding recesses of the window.

The mechanism 24 is then again withdrawn into the lateral space 18 and the tube is sealed by means of a force supplied by the hydraulic press, which joins the portions 9 and 10 so that an intermetallic contact is established between said portions.

Finally the glass bell 2 is removed as well as the ready vidicon tube.

The invention is described above with reference to one embodiment, but it will be obvious that the invention may be applied to all kinds of variants.

What is claimed is:
1. A method of manufacturing an electron tube having a sensitive layer readily decomposing under the action of heat, for example a vidicon tube, wherein in a vacuum space at two different places and at different temperatures, on the one hand a supporting body provided with a photo-sensitive layer and on the other hand the envelope mainly consisting of two portions with the further components of the electron tube, are degassed by heating, after which at a lower temperature the supporting body with the photo-sensitive layer is fastened in one of the envelope portions, the two envelope portions are united by pressing them together and the finished tube is removed from the vacuum space.

2. A device for manufacturing an electron tube having a heat-decomposable photo-sensitive layer comprising a chamber having a main vacuum space in which parts of the tube are mounted to form a sealed assembly and, an auxiliary vacuum space communicating with the main space, individual heating means for each of the vacuum spaces and means for moving a supporting body with the photo-sensitive layer from the auxiliary space to the main space.

3. A device as claimed in claim 2 in which cooling means for each of the vacuum spaces are provided.

No references cited.

RICHARD H. EANES, JR., *Primary Examiner.*